United States Patent [19]

Liedeck et al.

[11] 4,247,296

[45] Jan. 27, 1981

[54] DIAZO PIGMENTS

[75] Inventors: Egon Liedeck, Esslingen; Wolfgang Ruff, Stuttgart; Gerhard Berger, Stuttgart; Peter Reiter, Stuttgart, all of Fed. Rep. of Germany

[73] Assignee: BASF Farben & Fasern AG, Hamburg, Fed. Rep. of Germany

[21] Appl. No.: 77,140

[22] Filed: Sep. 19, 1979

[30] Foreign Application Priority Data

Sep. 22, 1978 [DE] Fed. Rep. of Germany ....... 2841243

[51] Int. Cl.³ .............................................. C09B 33/12
[52] U.S. Cl. ........................................ 8/506; 106/23; 106/288 Q; 260/42.21; 260/154; 260/174; 260/188; 260/202
[58] Field of Search .................. 260/154, 174, 188; 8/506; 106/23

[56] References Cited

U.S. PATENT DOCUMENTS

| | | | |
|---|---|---|---|
| 3,971,741 | 7/1976 | Dehmel et al. | 260/154 |
| 4,046,755 | 9/1977 | Mory et al. | 260/174 |
| 4,100,156 | 7/1978 | Muller | 260/188 |

*Primary Examiner*—A. Lionel Clingman
*Attorney, Agent, or Firm*—Toren, McGeady and Stanger

[57] ABSTRACT

A diazo pigment dye having the formula

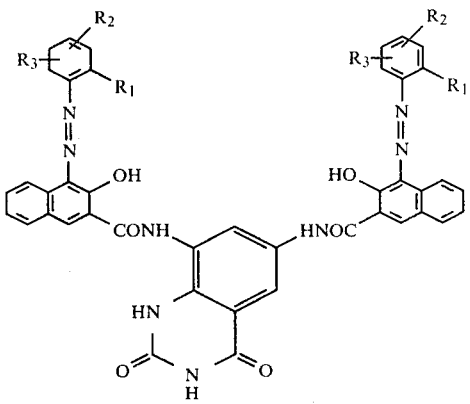

in which
  $R_1$ represents a hydrogen, chlorine or bromine atom or a nitro group, and
  $R_2$ and $R_3$ a hydrogen or chlorine atom or a methyl or methoxy group.

A new coupling component for preparing the pigment is also disclosed. The dye possesses good tinctorial and advantageous environmental properties. Methods for preparing the dye are disclosed.

8 Claims, No Drawings

DIAZO PIGMENTS

BACKGROUND OF THE INVENTION

1. Field of the Invention

This invention relates to diazo pigments and particularly to diazo pigments derived from novel coupling agents.

2. Description of the Prior Art

Diazo coloring agents, as a class, are well known and desirable because of their brilliant shades and good tinctorial properties. The diazo moieties of these pigments are usually prepared with coupling agents. However, one of the problems observed with such pigments is that they often require the presence of solubilizing agents which represent environmental pollutants.

SUMMARY OF THE INVENTION

We have discovered new diazo pigments and new coupling agents used in the preparation thereof which provide both excellent properties as pigments and also avoid the environmental problems resulting from the use of certain stabilizers.

These new diazo pigments have the formula

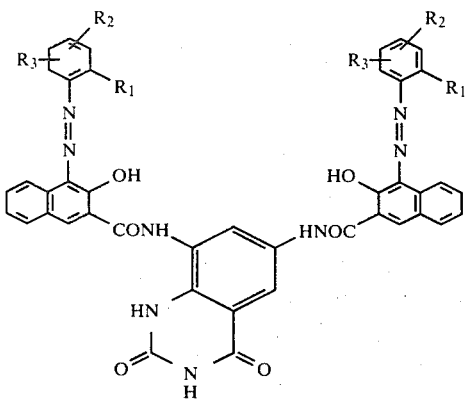

in which $R_1$ represents a hydrogen, chlorine or bromine atom or a nitro group, and $R_2$ and $R_3$ a hydrogen or chlorine atom or a methyl or methoxy group.

The new diazo pigments are derived from the new coupling component 6,8-bis-(2',3'-hydroxynaphthoylamino)-2,4-dioxotetrahydroquinazoline, while the diazo components represent well-known diazotization components.

All of these new diazo pigments are distinguished by brilliant shades and a high tinctorial strength and therefore form a technically valuable addition to the range of pigments hitherto available. In addition, these pigments generally have particularly good fastness properties, such as, for example, solvent stability, migration stability in polyvinyl chloride polymers and a high light fastness, so that they may be used in all areas of application of the pigment industry.

In the preparation of the new pigments by coupling, the ready solubility of the coupling component in aqueous alkali is particularly advantageous because it simplifies the preparation of the new pigments by coupling. As a result of the ready solubility in aqueous alkali, a solubilizer which would otherwise, because of its organic nature, contaminate the effluent, is not required for the preparation of an alkaline coupling solution in spite of the high molecular weight of the coupling component.

DESCRIPTION OF THE PREFERRED EMBODIMENT

The new diazo pigments are obtained simply by coupling with diazotization components by procedures which are well known. The pigments mentioned can, of course, also be obtained by condensation in which a pigment is first prepared from the diazo component and β-hydroxynaphthoic acid. This is then converted into the acid chloride which subsequently is condensed with 6,8-diamino-2,4-dioxotetrahydroquinazoline.

Although the diazo pigments, prepared by the two methods described, are insoluble in water, to the extent required for the intended application, they may be converted into a physically optimum form. This is accomplished by well-known methods, such as, for example, by salt grinding or by heating in solvents. Wetting agents of the ionic or nonionic type, such as, for example, sorbitan esters of fatty acids, aryl-alkyl sulfonates or fatty amines and their salts may also be used. The addition of these wetting agents can already take place during the coupling or in a subsequent treatment of the finished pigment.

The synthesis route for the preparation of the coupling component starts with anthranilic acid which is reacted with potassium cyanate to form 2,4-dioxotetrahydroquinazoline. This latter compound is subsequently nitrated to 6,8-dinitro-2,4-dioxotetrahydroquinazoline which is then reduced by conventional methods to 6,8-diamino-2,4-dioxotetrahydroquinazoline. The coupling is prepared from the 6,8-diamino-2,4-dioxotetrahydroquinazoline by a condensation process with two molecules of β-hydroxynaphthoyl chloride.

As the diazo component, particularly advantageous results are obtained when 2,4-dichloroaniline, 2,5-dichloroaniline or 2,4,5-trichloroaniline are used. In particular, these pigments are suitable for dyeing plastics, for example, PVC, as well as for the preparation of paints and printing inks.

The following examples illustrate the present invention:

EXAMPLE 1

1. Synthesis of the Coupling Component 1.1 Condensation of anthranilic acid with potassium cyanate to 2,4-dioxotetrahydroquinazoline

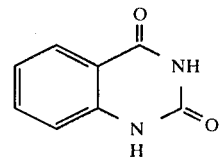

To 160 g of anthranilic acid dissolved in water, 120 g of potassium cyanate is added. The sodium salt is precipitated by the addition of 2,400 g of sodium hydroxide and isolated. After dissolving the salt in water, the 2,4-dioxotetrahydroquinazoline is precipitated.

1.2 Nitration of 2,4-dioxotetrahydroquinazoline with nitric acid to 6,8-dinitro-2,4-dioxotetrahydroquinazoline

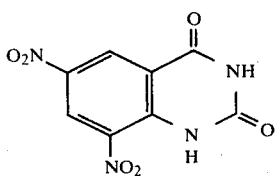

At 85° C., 104 g of nitric acid (d=1.42) is added dropwise to 80 g of 2,4-dioxotetrahydroquinazoline dissolved in concentrated sulfuric acid. After cooling to 20° C., the dinitro compound is isolated by precipitation on ice.

1.3 Reduction of the dinitro compound with tin(II) chloride to 6,8-diamino-2,4-dioxotetrahydroquinazoline

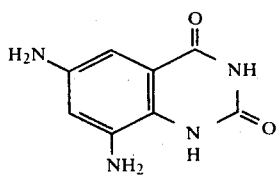

The dinitro compound (151 g) is added at 80° C. to a solution of 1,200 g of tin(II) chloride.2H$_2$O in concentrated hydrochloric acid. After a reaction time of four hours, the precipitated hydrochloride is isolated. After purifying the product by boiling in concentrated hydrochloric acid, it is suspended in water and the diamine is precipitated with 10% ammonium hydroxide solution at a pH of 6 to 7.

1.4 Condensation of the diamine with β-hydroxynaphthoyl to form 6,8-bis-(2',3'-hydroxynaphthoylamino)-2,4-dioxotetrahydroquinazoline

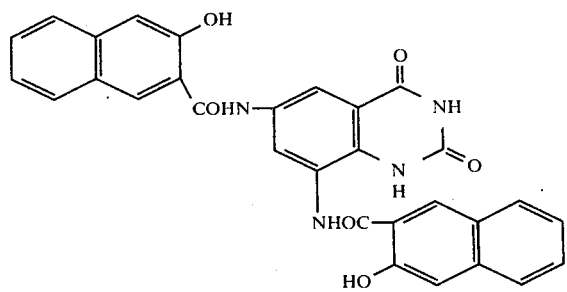

β-hydroxynaphthoyl (4.55 g) is dissolved in nitrobenzene. At 80° C., 1.92 g of diamine are added and the reaction is completed at 140° C. After cooling to 20° C., the product is isolated by filtration with vacuum.

EXAMPLE 2

2. Condensation Process for the Preparation of the Pigment

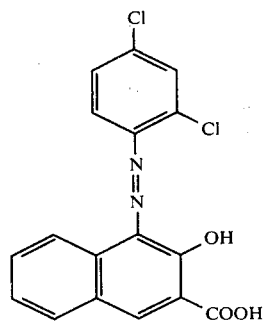

2.1

2,4-dichloroaniline (81.0 g), dissolved with heating in 600 g of water and 195.4 g of concentrated hydrochloric acid, is diazotized with 35.2 g of sodium nitrite and clarified by filtration. The diazo solution is added dropwise to 96.44 g of 2,3-hydroxynaphthoic acid, dissolved in 2,500 g of water and 60 g of sodium hydroxide. When the coupling reaction is completed, the suspension of the pigment is boiled and filtered under vacuum. The filter cake is then distilled azeotropically.

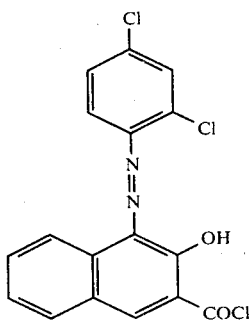

2.2

The pigment (21.67 g), prepared under 2.1, is reacted as a suspension in nitrobenzene with 13.6 g of thionyl chloride and excess acid chloride is distilled off again after the reaction.

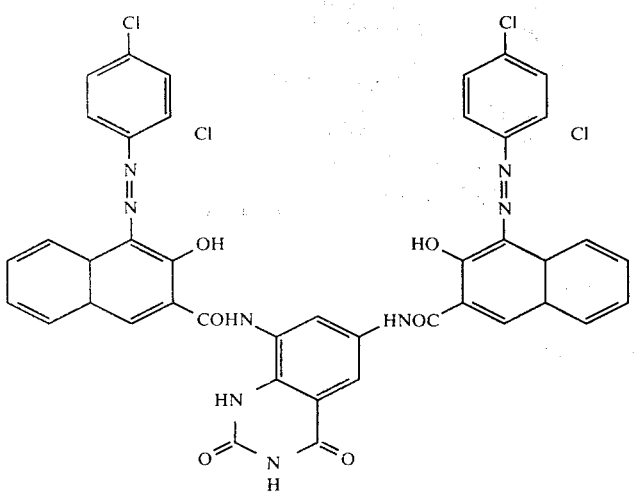

6,8-diamino-2,4-dioxotetrahydroquinazoline (5.49 g), dissolved in N-methylpyrrolidone, is added dropwise to the acid chloride which has not been isolated, and is mixed with 5.42 g of pyridine. After the reaction, the pigment is filtered off and boiled in water.

2.4 The dried, crude pigment is subjected to an after-treatment for 45 minutes at 120° C. in a ten-fold amount of N-methylpyrrolidone.

EXAMPLE 3

2,4-dichloroaniline (6.48 g) is stirred for three hours in 14.37 g of 30.5% hydrochloric acid, diluted with water and cooled with ice to 0° C. By the preferable rapid addition of a solution of 2.8 g of sodium nitrite in water, the aniline is diazotized. Stirring at 0° C. is continued for one hour until a clear solution is obtained.

To this solution, a solution of 6,8-bis-(2',3'-hydroxynaphthoylamino)-2,4-dioxotetrahydroquinazoline (10.74 g), 328 g of sodium hydroxide and 200 g of water, purified over A-charcoal was added dropwise at a constant rate. By the addition of acetic acid, the pigment suspension is adjusted to a pH of 3. It is then boiled for 10 minutes, filtered by the use of vacuum, washed until neutral and dried at 60° C.

There is obtained 16 g of a pigment dye which is finished by being boiled for one half hour in 722 g of nitrobenzene.

EXAMPLE 4

The procedure is similar to that described in Example 3, the difference being that 2,5-dichloroaniline (6.48 g) is used instead of the 2,4-dichloroaniline. The product is finished by boiling the filtered cake for one half hour in 325 g of dimethylformamide. A brilliant red pigment (14 g) with good fastness properties is obtained.

EXAMPLE 5

2,4,5-trichloroaniline (11.78 g) is dispersed by very rapid stirring for 30 minutes in 23.44 g of 37.2% hydrochloric acid and 6.44 g of 85% formic acid. It is then diluted with ice water, cooled to 0° C. and diazotized, preferably by the rapid addition of 4.23 g of sodium nitrite, dissolved in water. Stirring is continued for 2 hours at 0° C. until a clear solution is obtained.

This solution is added dropwise at room temperature to a solution of 16.11 g of 6,8-bis-(2',3'-hydroxynaphthoylamino)-2,4-dioxotetrahydroquinazoline, 1,192 g of sodium hydroxide and 300 g of water, purified over A-charcoal. By the addition of acetic acid, the pigment suspension is adjusted to a pH of 3, boiled briefly, filtered using a vacuum and washed until neutral and dried.

A pigment dye (27.8 g) is obtained which is finished by boiling for one half hour in 721.7 g of N-methylpyrrolidone.

What is claimed is:

1. Diazo pigment of the formula

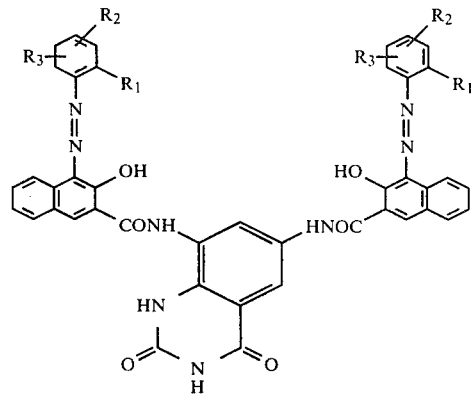

in which $R_1$ represents hydrogen, chlorine, bromine, or nitro, and $R_2$ and $R_3$ represent hydrogen, chlorine, methyl or methoxy.

2. The diazo pigment of claim 1 in which $R_3$ is hydrogen, and $R_2$ and $R_1$ are each chlorine in the 2,4 or 2,5-positions.

3. The diazo pigment of claim 1 wherein $R_1$, $R_2$ and $R_3$ are each chlorine in the 2, 4, and 5 positions.

4. A method for the preparation of diazo pigments comprising reacting compounds of amines having the formula

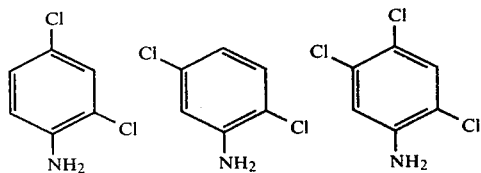

with coupling components having the formula

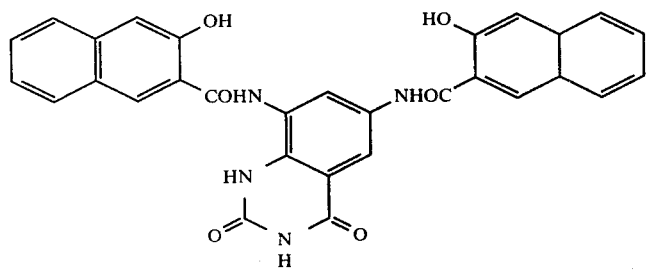

5. In a method for coloring materials selected from the group consisting of plastics, paints, and printing inks, wherein the material is contacted with a diazo pigment, the improvement which comprises said diazo pigment being the pigment of claim 1.

6. The method of claim 5 wherein the pigment is the pigment of claim 2.

7. The method of claim 5 wherein the pigment is the pigment of claim 3.

8. 6,8-bis-(2′,3′-hydroxynaphthoylamino)-2,4-dioxotetrahydroquinazoline.

* * * * *